United States Patent [19]

Amey et al.

[11] 3,938,167
[45] Feb. 10, 1976

[54] FILM CATCHER

[75] Inventors: John N. Amey, Winchester; Andrew S. Ivester, Charlestown, both of Mass.

[73] Assignee: Polaroid Corporation, Cambridge, Mass.

[22] Filed: May 2, 1974

[21] Appl. No.: 466,414

[52] U.S. Cl. .................................. 354/86; 354/174
[51] Int. Cl.² .......................................... G03B 17/50
[58] Field of Search ....... 354/83, 86, 174, 176, 180, 354/181, 186, 301, 304

[56] References Cited
UNITED STATES PATENTS

| | | | |
|---|---|---|---|
| 3,683,770 | 8/1972 | Land et al. | 354/86 |
| 3,810,211 | 5/1974 | Wareham et al. | 354/86 |

*Primary Examiner*—Richard M. Sheer
*Attorney, Agent, or Firm*—Alfred E. Corrigan

[57] ABSTRACT

Photographic apparatus for use with film units of the self-developing type. The apparatus includes a coil of opaque sheet material mounted adjacent an exit slot of the apparatus in position to be engaged by a leading edge of an exposed film unit as it is being advanced to the exterior of the apparatus by a pair of pressure-applying members. The sheet material is uncoiled by the advancing film unit so as to progressively cover, in lighttight relation, portions of the film unit which have been treated with a processing composition so as to prevent further exposure of untreated portions of the film unit by ambient light being transmitted lengthwise along the film unit. After the sheet material has been completely uncoiled, it is adapted to return towards its coiled configuration where it cooperates with other structure for releasably retaining the film unit in engagement with the apparatus after the latter has moved out of engagement with the pressure-applying members.

12 Claims, 10 Drawing Figures

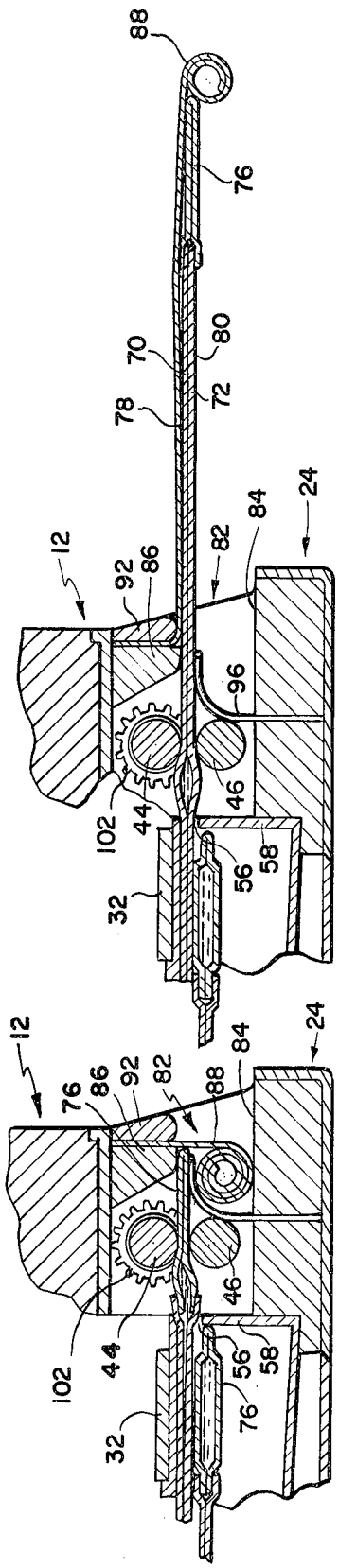
FIG. 2
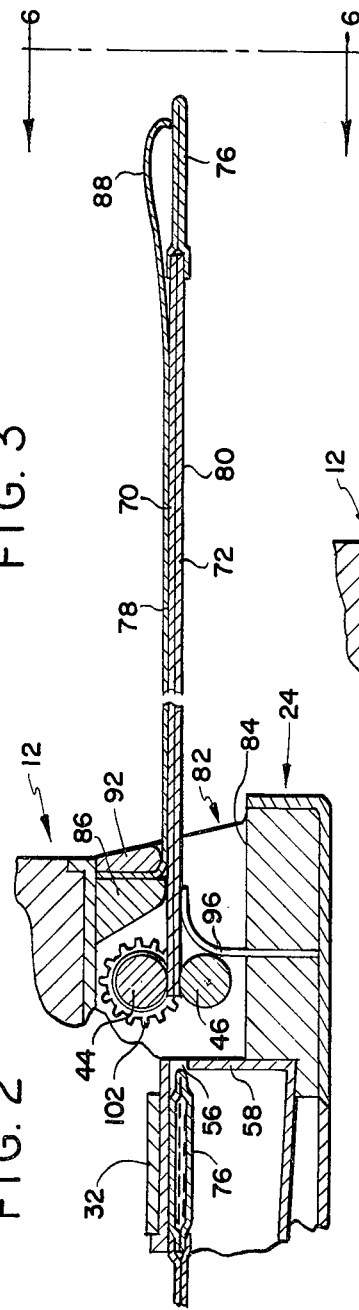
FIG. 3
FIG. 4
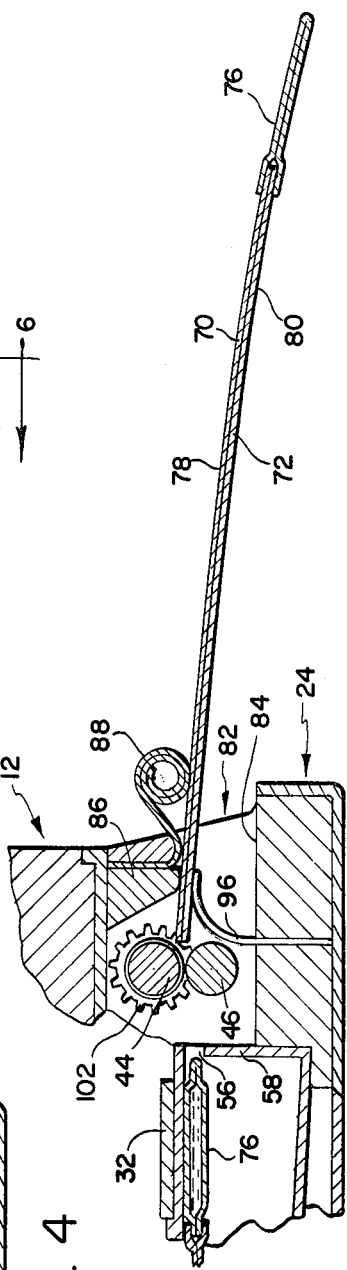
FIG. 5

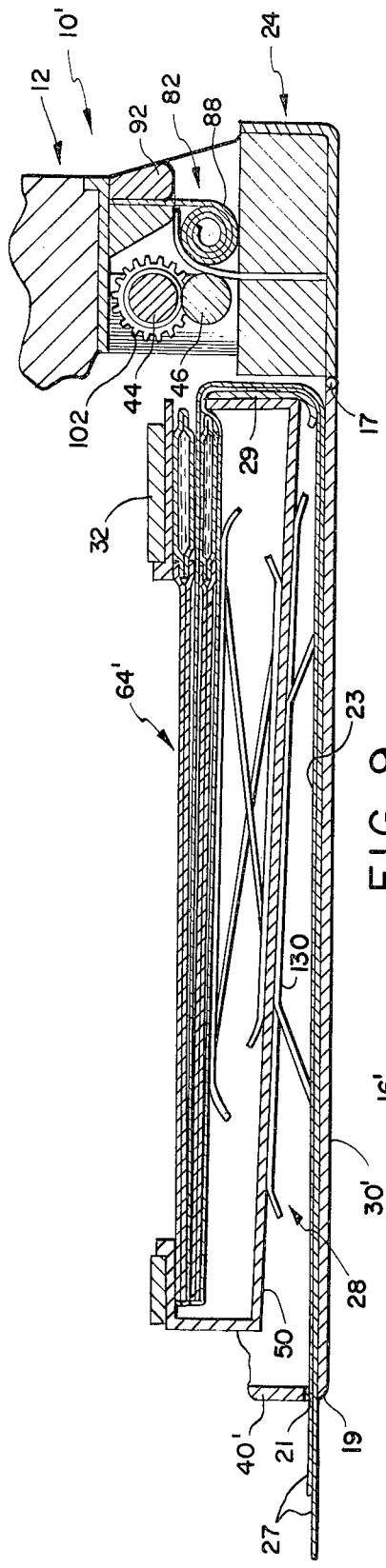
FIG. 9
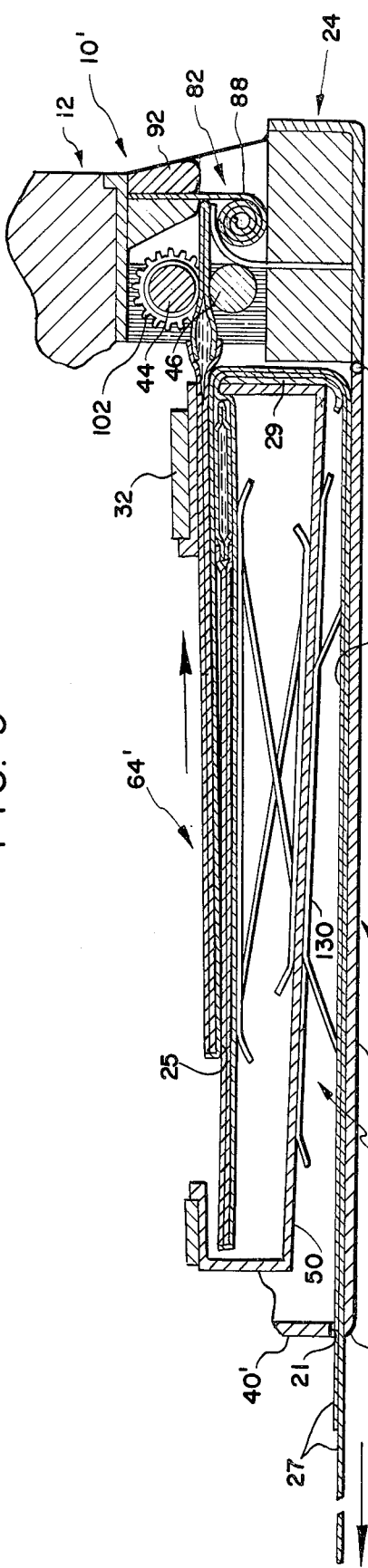
FIG. 10
FIG. 6

FILM CATCHER

REFERENCE TO RELATED APPLICATION

This application is related to copending application Ser. No. 466,371 filed on even date herewith by Andrew S. Ivester and entitled Opaque Shade.

BACKGROUND OF THE INVENTION

1. Field of the Invention

This invention relates to photographic apparatus of the self-developing type.

2. Description of the Prior Art

Photographic apparatus of the self-developing type are well known and generally comprise, e.g., a camera having a pair of pressure-applying members through which an exposed film unit is advanced while a processing composition is spread across a photosensitive layer of the film unit to initiate formation of a visible image in the film unit. The treated film unit is then advanced to a lighttight chamber wherein it remains for a period of time sufficient for a visible image to be substantially formed therein. Examples of cameras of the foregoing type may be found in U.S. Pat. Nos. 2,873,658; 3,396,647; and 3,537,370. Each of these patents shows a camera having a chamber for receiving at least a portion of a film unit as it is advanced from between a pair of rollers. The chambers in the first two mentioned patents function to prevent further exposure of a treated film unit to the ambient light while the chamber in U.S. Pat. No. 3,537,370 cooperates with a curtain in the form of a coil of opaque sheet material to prevent further exposure of an untreated film unit. In the latter patent, the leading edge of a film unit is adapted to engage a member on an end of the sheet and uncoil the curtain as they move together passed a viewfinder, thereby preventing further exposure of the film unit to light passing through the viewfinder. However, while the foregoing arrangements performed their function well, the chambers added to the overall dimensions of the cameras thereby placing them at an economic disadvantage relative to similar cameras of a more compact design.

Lately, there has been disclosed a family of film units of the self-developing type which can be advanced into the ambient light substantially immediately after the processing composition has been spread across at least a predetermined length of the film unit. One example of this type of film unit is described in U.S. Pat. No. 3,415,644 granted to Edwin H. Land on Dec. 10, 1968. Film units of this type enhance the compactness of cameras with which they are adapted to be used in that the cameras may be designed to advance a section of the film unit which has been treated with a processing composition from the camera while a section of that film unit yet untreated with the processing composition still remains within the camera.

In order for such an arrangement to be possible, the aforementioned film unit includes a relatively thin, substantially light transparent layer or element, which may comprise a polyester, such as a polymeric film derived from ethylene glycol terephthalic acid, or a cellulose derivative such as cellulose triacetate, defining an outside face or surface of the film unit, and a rupturable pod of processing composition that includes an opacifying constituent. During exposure operations image-carrying light rays from the camera's lens pass through the transparent surface layer before impinging upon a photosensitive layer of the film unit. As the film unit is subsequently advanced between a pair of spread rollers and towards the film exit means of the camera, the spread rollers progressively distribute a mass of the processing composition intermediate predetermined layers of the film unit. Thus, those portions of the film unit progressively exposed to ambient light have been treated by the processing composition with its opacifying constituent which precludes ambient light subsequently incident upon the transparent layer and which is actinic to the photosensitive layer from reaching adjacent or underlying sections of the photosensitive layer. Once the diffusion transfer process has been completed, the developed image is viewable through the aforementioned transparent element.

One of the considerations in camera systems of the aforementioned type is a phenomenon generally referred to as "light-piping." More specifically, light-piping comprises ambient light, which is actinic to the photosensitive layer, incident upon any portion of the transparent material exteriorly of the camera during film processing operations being conducted thereby to portions thereof adjacent yet untreated sections of the exposed photosensitive layer of the film unit. Such light rays can cause undesirable "fogging" of those yet untreated sections of the film unit's photosensitive layer.

To understand this phenomenon more clearly, it should be recognized that the aforementioned film unit comprises an opaque dimensionally stable layer or support element positioned on the side of its photosensitive layer opposed from its light transparent layer. Thus, once the processing composition including its opacifying constituent has been spread across the photosensitive layer, that photosensitive layer is protected from ambient light incident upon the film unit which is actinic to the photosensitive layer, and its development process may therefore be completed when the film unit itself is exposed to ambient light. However, in the aforementioned camera arrangement, a treated section of each such film unit is exposed to ambient light while a section thereof remains on the opposite side of the spread rollers within a light protected chamber of the camera and is yet untreated with the processing composition. While at such times ambient light incident upon the transparent layer of the treated section of the film unit cannot pass through the layer of processing composition to adjacent portions of the exposed photosensitive layer, a portion of these light rays may be reflected internally of the light transparent layer and scatter or diffuse lengthwise therealong into the light protected camera chamber until it reaches a point within the light transparent layer in advance of the composition being spread intermediate the film unit's transparent and photosensitive layers. Since there is no opacifying agent intermediate the light transparent layer and the adjacent portion of the exposed photosensitive layer at this point, these light rays, if actinic to the photosensitive layer, will have the effect of further exposing, or fogging, the yet untreated section of the photosensitive layer.

One solution to this light-piping problem as disclosed in copending U.S. Patent application Ser. No. 419,808 by Edwin H. Land entitled NOVEL PRODUCTS AND PROCESSES filed on Nov. 28, 1973 is to include an opacifying pigment in the light transparent or conducting layer itself. Such an opacifying pigment may comprise carbon black particles in such amounts as to offer little resistance to light rays passing therethough in its relatively thin (thickness) dimension, i.e., so as to not materially impair the ability to expose the photosensitive layer therethrough nor the ability to subsequently view therethrough the final image produced in the image-receiving layer or element. However, at the same time the amount of such pigment is sufficient to substantially preclude ambient light which is actinic to the photosensitive layer from being piped lengthwise through the light transparent layer to sections thereof in advance of the processing composition. In other words, when the camera lens is operative to expose the photosensitive layer, the image-carrying light rays pass through a very thin section of the light transparent element of the film unit and hence the opacifying pigment therein offers little resistance to such light rays. Similarly, the opacifying pigment does not materially affect the ability to view the final image through the transparent layer in which it is retained. However, ambient light rays attempting to pass through the same light transparent layer of the film unit must be light-piped through a much larger distance thereof, i.e., in its lengthwise direction, before reaching untreated portions of the photosensitive layer and hence the opacifying pigment is highly effective in precluding the passage of those light rays which are actinic to the photosensitive layer therethrough.

Aforementioned copending application Ser. No. 419,808 discloses densities of opacifying pigments employed in light transparent layers of particular film units which have proven suitable for resolving the light-piping problem without materially diminishing the quality of the finished photographic print. However, it will be recognized that it is highly desirable to minimize the light resistant characteristic of the film unit's light transparent layer during normal film exposure operations and therefore desirable to minimize the density of the opacifying pigment in the light transparent layer whenever this can readily be accomplished while still precluding the light-piping phenomenon and without compromising the size of the camera structure. It is to this end that one aspect of the present invention is directed.

SUMMARY OF THE INVENTION

The instant invention relates to photographic apparatus and, more particularly, to a camera of the self-developing type especially designed for use with film units which are adapted to be advanced to the exterior of the camera substantially immediately after being treated with a processing composition. The camera includes a chamber for locating and supporting a film unit in position for exposure and film-advancing means, forming a part of the film unit or the apparatus, which is adapted to advance an exposed film unit between a pair of driven rollers. The rollers are adapted to spread a processing composition between photosensitive and transparent layers of the film unit while simultaneously advancing treated portions of the film unit into the ambient light via an exit opening in the camera. In order to protect the as yet untreated portion of the photosensitive layer of the film unit from being fogged by light being piped or transmitted along the length of the transparent layer, a curtain formed from a resilient opaque material, e.g., Mylar, is mounted adjacent to and preferably in lighttight relation with the exit opening and in the path of travel of the advancing film unit. The curtain is formed such that it has a coiled or rolled configuration when in a non-stressed condition. Means are provided for attaching one end of the coil of opaque material to the camera at a position adjacent the exit opening such that as the leading edge of the exposed film unit passes beyond the bite of the rollers, it engages the curtain and uncoils it as treated portions of the film unit exit into the ambient light. As the curtain uncoils, it progressively covers those portions of the transparent layer emerging from the exit opening thereby preventing any of the ambient light which is actinic to the photosensitive layer from striking the transparent layer and being piped along its length to a position behind the rollers where it would fog the yet untreated portions of the photosensitive layer. At this point, it should be noted that the opacifying pigment in the transparent layer need not be of a density that would preclude all transmission of light along the length of the transparent layer. Its density may only need to be sufficient to stop the light which is actinic to the photosensitive layer after it has travelled along the length of the transparent layer a predetermined distance, e.g., 2 inches. Accordingly, it can be seen that the transparent layer must be protected from the light as it passes from the exit opening until said predetermined distance has been exceeded. Stated another way, a two inch length of the transparent layer, as measured in the direction of the movement of the film unit from the line between treated and untreated portions of the photosensitive layer, must always be protected from the ambient light until the photosensitive layer has been completely covered by the processing composition. If the transparent layer does not contain any opacifying pigment, the transparent layer must be protected from actinic light until the entire photosensitive layer has been treated, in which case the aforementioned predetermined distance would be substantially equal to the length of the photosensitive layer. After the photosensitive layer has been completely treated with the processing composition, the curtain may be released from engagement with the film unit and returned to substantially its original position in or adjacent to the exit opening. The length that the curtain can be unrolled through is at least equal to the aforementioned predetermined distance and in the preferred embodiment is such that when the curtain has been fully uncoiled, the leading edge of the film unit moves out of engagement with the free end of the curtain. Once the leading edge of the film unit moves out of engagement with the free end of the curtain, it, the curtain, automatically returns toward its coiled configuration wherein it cooperates with a pair of resilient tabs to releasably retain the film unit in engagement with the camera after the film unit has moved out of engagement with the rollers. This return is accomplished in the preferred embodiment of the invention by the resiliency of the material while in an alternative embodiment a spring is provided.

An object of the invention is to provide photographic apparatus of the self-developing type with an extendible opaque light barrier which, in a first position, prevents further exposure of an exposed film unit as it is being advanced to a position outside of the apparatus and which functions in a second position to releasably retain the exposed film unit in engagement with the apparatus.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIGS. 2–5 are sectional views, partly in section, of the apparatus of FIG. 1 diagrammatically illustrating the relationship between an exposed film unit and the apparatus of the invention as the film unit is advanced to a position outside of the apparatus;

FIG. 6 is a front elevational view of a portion of the apparatus taken generally along the line 6—6 of FIG. 4;

FIGS. 9 and 10 are side elevational views showing the instant invention in use with a film assemblage wherein the film units are manually moved into the bite of a pair of rollers.

DETAILED DESCRIPTION OF THE INVENTION

Figure 1:
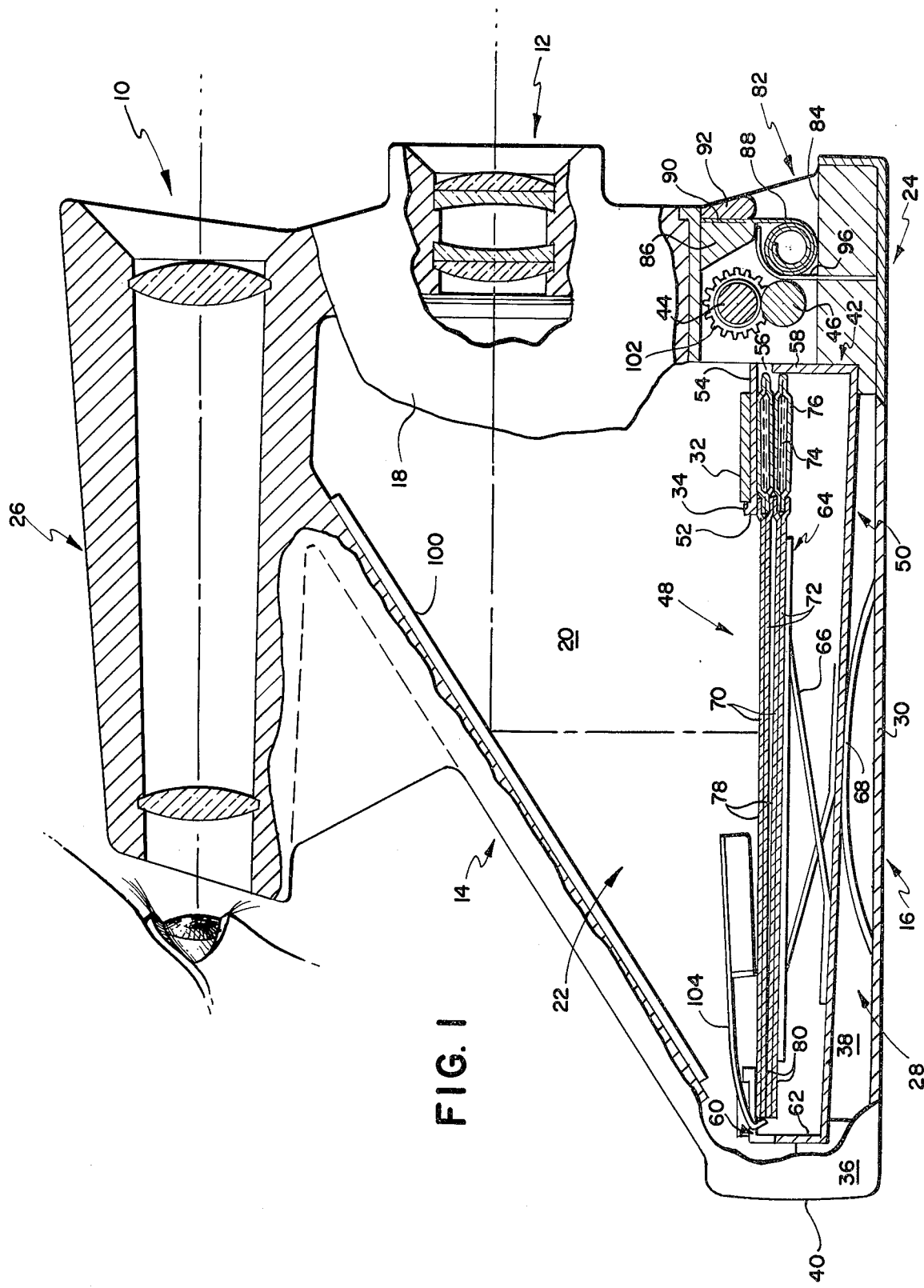
FIG. 1 is an elevational view, partly in section, of photographic apparatus embodying the instant invention.

Reference is now made to FIG. 1 of the drawings wherein is shown photographic apparatus in the form of a self-developing type camera 10. Camera 10 includes a plurality of housing sections 12, 14 and 16 which cooperate with a pair of side walls 18 and 20 to define an exposure chamber 22. Extending forwardly of and pivotally coupled to housing section 16 is a housing 24. Extending upwardly from housing sections 12 and 14 is a conventional viewfinder 26 through which the scene to be photographed may be viewed and/or focused.

Housing section 16 includes an open end chamber 28 defined in part by a bottom wall 30, a platelike member 32 having an exposure aperture 34 therein, side walls 36 and 38 and an end wall 40. Extending across the open end 42 of chamber 38 is a pair of pressure-applying members in the form of rollers 44 and 46. The rollers 44 and 46 are mounted within housing section 24 for movement therewith between the position shown in FIG. 1 and a film loading position wherein housing section 24 has been pivoted clockwise through an angle of approximately ninety degrees to allow a film cassette 48 to be inserted into chamber 28 via opening 42.

The film cassette 48 comprises a container 50 having an exposure opening 52 in a forward wall 54, an elongated opening 56 in leading end wall 58, and a slot 60 in the left-hand portion of forward wall 54 which also extends part way down a trailing end wall 62. Mounted within container 50 are a plurality of film units 64, a platen 66 for resiliently urging the forwardmost film unit into engagement with forward wall 54, preferably a battery (not shown) for providing the energy to operate various components of the camera as is well known in the art, and a conventional dark slide (not shown). A spring 68 mounted on wall 30 of chamber 28 cooperates with forward wall 32 to located the forwardmost film unit 74 in position for exposure.

The film units 64 are preferably of the type described in the aforementioned U.S. Pat. No. 3,415,644 and are diagrammatically illustrated as including superposed image-receiving and photosensitive systems 70 and 72 between which a processing composition 74, located within a pod 76 attached to leading edges of the image-receiving and photosensitive systems 70 and 72, is adapted to be spread to initiate formation of a visible image in the film unit. Image-receiving system 70 includes a transparent, light transmitting layer 78, preferably formed from Mylar, through which the photosensitive system is exposed, and the rearwardly facing surface of the latter system is provided with an opaque layer 80.

Housing section 24 includes an exit opening 82 defined by spaced members 84 and 86 through which an exposed film unit is adapted to be advanced by rollers 44 and 46. Mounted adjacent exit opening 82 and in lighttight relation therewith is a curtain 88 formed from a generally rectangular sheet of opaque, resilient material e.g., Mylar, having a thickness of approximately 0.0015 inch and a width substantially equal to that of the film unit. The curtain 88 is preferably formed by wrapping the material around a mandrel and heat treating it such that its normal unstressed configuration will be that of a coil. Alternatively, the material may be coiled, inserted into a metal tube and then heat treated. One end 90 of curtain 88 is suitably secured between members 86 and 92 so as to locate the remainder of the curtain in position to be uncoiled by the leading edge of the film unit as it is being advanced to the exterior of the camera. Also mounted on housing section 24 and extending into engagement with member 86 are a pair of resilient tabs 94 and 96, the function of which will be described hereinafter.

The operator of the camera initiates an exposure cycle by actuation of a start button or switch (not shown). Actuation of the button results in the forwardmost film unit 64 being exposed via light passing through a lens and shutter assembly 98 and being reflected by a mirror 100 onto the photosensitive layer of the film unit. After the exposure, power is transmitted from the camera's motor to a gear 102 attached at one end to roller 44 to rotate the rollers 44 and 46, and to a film advancing apparatus comprising a film engaging member 104 to actuate the latter in a reciprocating manner so as to engage the trailing edge of the exposed film unit and advance it into engagement with the rotating rollers. The rollers continue to advance the exposed film toward the exterior of the camera via exit opening 82 while simultaneously spreading the processing composition 74 across the photosensitive system 72 of the exposed film unit, as shown in FIG. 2. As the leading edge of the exposed film unit leaves the bite of rollers 44 and 46 it first deflects tabs 94 and 96 and then engages curtain 88 and progressively uncoils it, as shown in FIGS. 2 and 3, so as to prevent ambient light from striking those portions of the light transmitting layer 78 overlying the treated portions of the photosensitive system 72 and being piped lengthwise along this layer to portions of the layer overlying untreated portions of the photosensitive system 72 where it may fog the photosensitive system. As shown in FIG. 4, the rollers 44 and 46 continue to advance the exposed film unit until the curtain 88 has been fully uncoiled. At this time the rollers 44 and 46 have substantially completed spreading the processing composition and the trailing edge of the film unit is entering the bite of the rollers.

Further advancement of this exposed film unit results in its leading edge moving out of engagement with the free end of the curtain 88 thereby allowing the latter to recoil itself as it moves back toward the exit opening 82. At substantially this time the trailing edge of the film unit moves out of engagement with the rollers 44 and 46 and the film unit is releasably retained by the resilient action of tabs 94 and 96 and the coiled curtain 88, as shown in FIG. 5.

Figure 7:
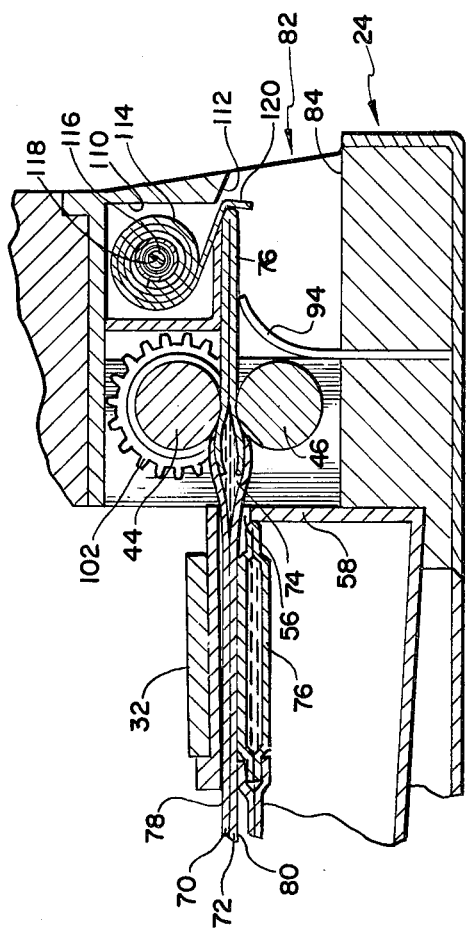
FIG. 7 is a sectional view, partly in section, of an alternative embodiment of the invention.
Figure 8:
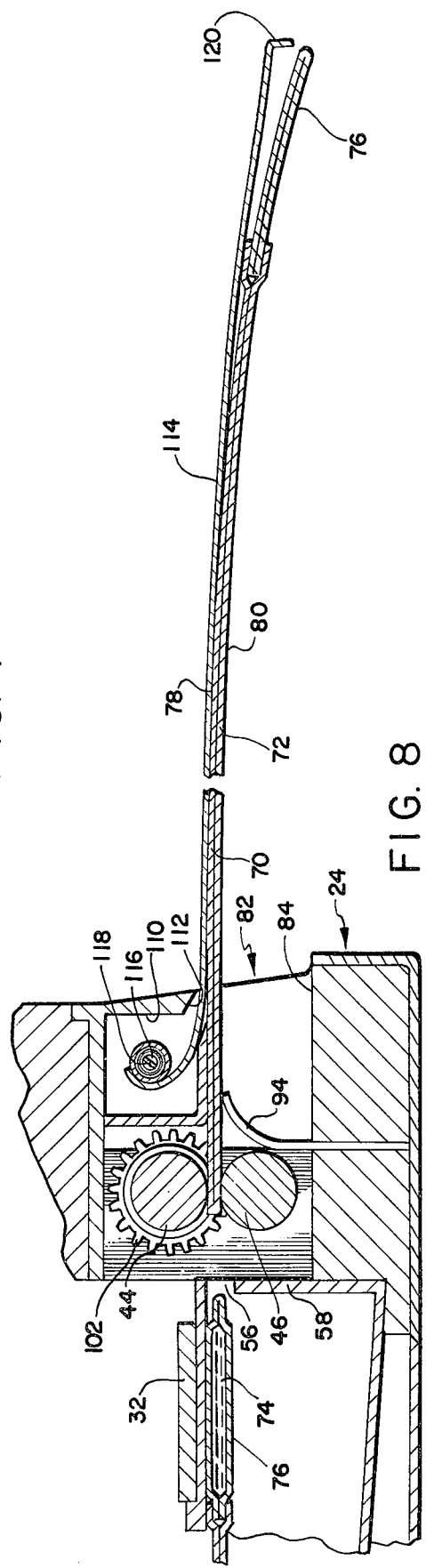
FIG. 8 is a view similar to FIG. 7 showing the film unit of FIG. 7 as it is about to be moved out of engagement with a pair of rollers.

Reference is now made to FIGS. 7 and 8 of the drawings wherein is shown another embodiment of the instant invention. In this embodiment, the roller housing section 24 includes a chamber 110 having an opening 112 therein. Mounted within chamber 110 is a curtain 114 formed from a generally rectangular sheet of opaque material. One end of the curtain 114 is suitably attached to a roller 116 having suitable spring means 118 mounted thereon, much like the conventional window shade. The other end of the curtain 114 is provided with a down-turned lip 120 which is located exteriorly of chamber 118 in position to be engaged by the leading edge of an exposed film unit as it exits from the bite of rollers 44 and 46. As in the previously described preferred embodiment, rollers 44 and 46 advance the exposed film unit toward and through exit opening 82 while simultaneously spreading the processing composition 74 across the photosensitive system 72 of the film unit. As the exposed film unit exits from the bite of the rollers, its leading edge deflects tabs 94 and 96 and then engages lip 120 and gradually uncoils the curtain 114 so as to progressively cover all portions of the light transmitting layer 78 as the film unit leaves the camera thereby preventing any light, which is actinic to the photosensitive system 72, from being piped or transmitted by portions of layer 78 which are to the right of rollers 44 and 46 to portions of layer 78 which are to the left of the rollers. As the curtain 114 is uncoiled, relative rotational motion between roller 116 and spring means 118 results in the latter being progressively tensioned. The advancing film unit continues to uncoil the curtain 114 until substantially its entire length has been run out. At this point, the trailing end of the film unit is about to leave the bite of rollers 44 and 46 and further advancement of the film unit results in the leading edge of the film unit moving out of engagement with lip 120, as shown in FIG. 8. Spring means 118 now recoils the curtain 114 back towards its original position where it cooperates with tabs 94 and 96 to releasably retain the trailing end of the film unit in much the same manner as shown in FIG. 5.

Reference is now made to FIGS. 9 and 10 of the drawings wherein is shown a camera 10' which is substantially identical to the camera 10 described in FIGS. 1-6 except for the absence of any film engaging member 104 and for a modified housing section 16'. Housing section 16' includes a rear wall 30' suitably hinged at 17 for counterclockwise rotation to a film cassette loading position. A pair of biasing springs 130 (only one of which is shown) are mounted at opposite lateral sides of wall 30° for urging a film cassette 50 against member 32. One end 19 of wall 30° cooperates with a trailing end wall 40' to provide an aperture 21 through which a leader attached to a film unit may be withdrawn. Each of the film units 64' is substantially identical to the film units 64 previously described except for the addition of a leader 23. Each leader 23 is detachably secured, e.g., by an adhesive, at one end 25 to the opaque layer 80 near the trailing end (to the left as viewed in FIGS. 9 and 10) of the film unit. The opposite end 27 of each leader extends around a guide member 29, between biasing springs 130 and through aperture 21 to the exterior of the camera. After the forwardmost film unit 64' has been exposed, the photographer grasps the end 27 of the lowermost leader 23 and pulls it to the left thereby resulting in the exposed film unit being manually advanced into engagement with the rotating rollers 44 and 46. Rollers 44 and 46 continue to advance the exposed film unit to the exterior of the camera as described hereinbefore with reference to the embodiment described in FIGS. 1-6. Leader 23 eventually is detached from the film unit either by being stripped away from the film unit by the opposing forces of the rollers and the photographer or, as is well known in the art, is detached from the film unit when the force being directed along the leader is substantially perpendicular to its point of attachment to the film unit. Although the leader 23 has been described as being releasably secured near the trailing end of the film unit, it should be understood that its point of attachment may be at any point thereon so long as it advances the leading end of the film unit into the bite of the rollers.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for processing and releasably retaining an exposed film unit of the type including a plurality of superposed layers including photosensitive and transparent layers, and a processing composition including an opacifying agent which is adapted to be spread across the photosensitive layer comprising:
    means for supporting the film unit in position for exposure of the photosensitive layer;
    pressure-applying means including a pair of juxtaposed members between which the exposed film unit is adapted to be advanced leading edge first during spreading of the processing composition;
    means defining an exit opening located forwardly of said pressure-applying means through which the film unit is adapted to be advanced to the exterior of said photographic apparatus;
    resilient means mounted on the same side of said pressure-applying means as said exit opening for frictionally engaging one side of the film unit as it passes through said pressure-applying means; and
    opaque means mounted adjacent said exit opening for movement in a first direction wherein it progressively covers at least a predetermined area of the transparent layer of the film unit as it passes through said exit opening for preventing ambient actinic light from being transmitted by portions of the transparent layer forward of said pressure-applying members to portions of the transparent layer rearwardly of said pressure-applying means, and in a second direction, generally opposite said first direction wherein it cooperates with said resilient means for releasably retaining an end portion of the film unit after the film unit has moved out of engagement with said pressure-applying means.

2. Photographic apparatus as defined in claim 1 further including means for mounting said opaque means in the path of travel of the film unit as the film unit moves from between the pressure-applying means such that the leading edge of the film unit engages said opaque means and progressively extends said opaque means in said first direction in lightlight relation with at least said predetermined area of the transparent layer as the latter passes through said exit opening.

3. Photographic apparatus as defined in claim 2 wherein said opaque means comprises a coil of resilient material one end of which is secured adjacent said exit opening by said mounting means and which is adapted to be at least partially uncoiled by the advancing film unit.

4. Photographic apparatus as defined in claim 1 wherein said opaque means comprises a coil of material and said photographic apparatus further includes means for mounting said coil in position to be at least partially uncoiled by the leading edge of the film unit through a predetermined distance.

5. Photographic apparatus as defined in claim 4 further including means for moving said opaque means in said second direction after said pressure-applying members have advanced the leading edge of the film unit a distance greater than said predetermined distance.

6. Photographic apparatus as defined in claim 5 wherein said moving means includes a spring.

7. Photographic apparatus as defined in claim 1 wherein said opaque means comprises a sheet of resilient material formed to assume a coiled configuration when in a nonextended position and adapted to be uncoiled through a distance less than that which the leading edge of the film unit moves past said exit opening whereby said opaque means moves out of engagement with the leading edge of the film unit and automatically returns toward said coiled configuration in said nonextended position when the leading edge of the film unit has been advanced past said exit opening a distance greater than the distance said opaque means has been coiled.

8. Photographic apparatus for processing and releasably retaining an exposed film unit of the type including a plurality of superposed layers including photosensitive and transparent layers, and a processing composition including an opacifying agent which is adapted to be spread across the photosensitive layer comprising:
  means for supporting the film unit in position for exposure of the photosensitive layer;
  pressure-applying means including a pair of juxtaposed members between which the exposed film unit is adapted to be advanced leading edge first during spreading of the processing composition;
  means defining an exit opening located forwardly of said pressure-applying means through which the film unit is adapted to be advanced to the exterior of said photographic apparatus; and
  means for releasably engaging opposite surfaces of a trailing end of the exposed film unit after it has moved out of engagement with said pressure-applying means, said engaging means including a coil of opaque sheet material having a portion mounted adjacent said exit opening in position to be engaged by the leading edge of the exposed film unit as it moves out of engagement with said pressure-applying means for movement toward a first position wherein said sheet material is at least partially uncoiled and is located in lighttight relation with a predetermined area of the transparent layer and a second position wherein said sheet material is substantially in its coiled configuration and frictionally engages the transparent layer near the trailing end of the exposed film unit.

9. Photographic apparatus as defined in claim 8 wherein said engaging means further includes means for moving said sheet material from said first position to said second position.

10. Photographic apparatus as defined in claim 9 wherein said sheet material is formed at least in part from a resilient material which comprises said moving means.

11. Photographic apparatus as defined in claim 9 wherein said moving means comprises a spring.

12. Photographic apparatus for processing an exposed film unit including a pod of processing fluid located adjacent a leading edge thereof and arranged to release the processing fluid retained therein responsive to a compressive force being exerted thereagainst, the film unit further including a photosensitive layer, said apparatus comprising:
  a housing formed of opaque material, said housing being configured to retain at least one of the exposed film units at a given position and to define an opening through which the film unit may be advanced from said housing;
  a pair of elongated juxtaposed members located intermediate said given position within said housing and said opening and arranged to first exert a compressive force on the pod to release the processing fluid retained therein and then to subsequently direct the released processing fluid progressively over the photosensitive layer responsive to the exposed film unit being advanced from its given position within said housing through said opening; and
  means for retaining the film unit in a substantially fixed position after its photosensitive layer has been treated with the processing fluid and a major portion thereof has been advanced through said opening and for automatically temporarily substantially protecting at least one side of the film unit which is located exteriorly of said housing from ambient light rays as it emerges from said housing through said opening, said means including an opaque member initially mounted within said housing and arranged to automatically temporarily extend exteriorly of said housing as the unit is advanced through said opening.

* * * * *